US012734583B2

(12) United States Patent
Himmel et al.

(10) Patent No.: US 12,734,583 B2
(45) Date of Patent: Sep. 15, 2026

(54) METHOD AND APPARATUS FOR MANUFACTURING A COMPONENT IN LAYERS

(71) Applicant: GROB-WERKE GmbH & Co. KG, Mindelheim (DE)

(72) Inventors: Benjamin Himmel, Munich (DE); Johannes Glasschröder, Neusäß (DE); Martin Otter, Memmingen (DE); Oliver Leusch, Augsburg (DE); Christian Miklec, Bad Wörishofen (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 434 days.

(21) Appl. No.: 18/274,601

(22) PCT Filed: Jan. 12, 2022

(86) PCT No.: PCT/EP2022/050482
§ 371 (c)(1),
(2) Date: Jul. 27, 2023

(87) PCT Pub. No.: WO2022/161764
PCT Pub. Date: Aug. 4, 2022

(65) Prior Publication Data
US 2024/0091859 A1 Mar. 21, 2024

(30) Foreign Application Priority Data
Jan. 28, 2021 (DE) ..................... 10 2021 101 984.2

(51) Int. Cl.
*B22F 10/38* (2021.01)
*B22F 10/22* (2021.01)
(Continued)

(52) U.S. Cl.
CPC ............ *B22F 10/385* (2021.01); *B22F 10/22* (2021.01); *B22F 10/85* (2021.01); *B22F 12/50* (2021.01);
(Continued)

(58) Field of Classification Search
CPC ...... B22F 10/22; B22F 10/366; B22F 10/385; B29C 64/112; B33Y 50/02
See application file for complete search history.

(56) References Cited

U.S. PATENT DOCUMENTS 7,183,335 B2 2/2007 Napadensky
7,209,797 B2 4/2007 Kritchman et al.
(Continued)

FOREIGN PATENT DOCUMENTS

CN 1270883 A 10/2000
CN 105618756 B 3/2018
(Continued)

OTHER PUBLICATIONS

English translation of the Written Opinion of the International Searching Authority in parent application No. PCT/EP2022/050482.
(Continued)

*Primary Examiner* — Vanessa T. Luk
(74) *Attorney, Agent, or Firm* — J-TEK LAW PLLC; Jeffrey D. Tekanic; Scott T. Wakeman

(57) ABSTRACT

A method for manufacturing a component in layers includes dropwise application of a liquid material using a printhead. More particularly, a layer (14) of the component to be produced is divided into an outer region (20) and a central core region (18), and the liquid material (16) is applied successively in the outer region (20) and the core region (18). One or more parameters relating to the spacing between paths to be traversed, the drop size, the spacing
(Continued)

between successive drops, etc. is selected so that the layer (14) will have a thickness that is as uniform as possible.

20 Claims, 3 Drawing Sheets

(51) Int. Cl.

| | |
|---|---|
| ***B22F 10/85*** | (2021.01) |
| ***B22F 12/50*** | (2021.01) |
| ***B22F 12/90*** | (2021.01) |
| ***B33Y 10/00*** | (2015.01) |
| ***B33Y 30/00*** | (2015.01) |
| ***B33Y 50/02*** | (2015.01) |

(52) U.S. Cl.

CPC .............. *B22F 12/90* (2021.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 7,300,619 | B2 | 11/2007 | Napadensky et al. |
| 7,604,768 | B2 | 10/2009 | Kritchman |
| 7,628,857 | B2 | 12/2009 | Kritchman et al. |
| 7,658,976 | B2 | 2/2010 | Kritchman |
| 7,958,841 | B2 | 6/2011 | Kritchman et al. |
| 9,183,325 | B2 | 11/2015 | Wighton et al. |
| 10,232,443 | B2 | 3/2019 | Myerberg et al. |
| 10,315,247 | B2 | 6/2019 | Mark |
| 10,350,682 | B2 | 7/2019 | Myerberg et al. |
| 2002/0008333 | A1 | 1/2002 | Napadensky et al. |
| 2010/0228369 | A1 | 9/2010 | Eggers et al. |
| 2012/0113439 | A1 | 5/2012 | Ederer |
| 2016/0009026 | A1 | 1/2016 | Kraibühler et al. |
| 2016/0107234 | A1 | 4/2016 | Craeghs et al. |
| 2016/0207263 | A1 | 7/2016 | Gordon |
| 2017/0028651 | A1 | 2/2017 | Versluys et al. |
| 2017/0089774 | A1 | 3/2017 | Rykaczewski et al. |
| 2017/0106589 | A1 | 4/2017 | Ishida et al. |
| 2017/0252821 | A1 | 9/2017 | Sachs et al. |
| 2017/0297097 | A1 | 10/2017 | Gibson et al. |
| 2017/0326789 | A1 | 11/2017 | Kimblad et al. |
| 2018/0154439 | A1 | 6/2018 | Mark |
| 2018/0243984 | A1 | 8/2018 | Hayashida et al. |
| 2018/0304369 | A1 | 10/2018 | Myerberg et al. |
| 2018/0311732 | A1 | 11/2018 | Naga et al. |
| 2018/0370155 | A1 | 12/2018 | Courter et al. |
| 2019/0039137 | A1 | 2/2019 | Hildreth et al. |
| 2019/0193335 | A1 | 6/2019 | Giller et al. |
| 2019/0314895 | A1 | 10/2019 | Hildreth et al. |
| 2020/0009795 | A1 | 1/2020 | Gibson et al. |
| 2021/0138552 | A1 | 5/2021 | Hildreth et al. |
| 2021/0252589 | A1 | 8/2021 | Himmel et al. |
| 2021/0287874 | A1 | 9/2021 | Wang et al. |
| 2022/0168812 | A1 | 6/2022 | Gibson |
| 2022/0234111 | A1* | 7/2022 | Mantell .................. B22F 10/22 |
| 2024/0109126 | A1 | 4/2024 | Glasschröder et al. |
| 2024/0253306 | A1 | 8/2024 | Glasschröder et al. |

FOREIGN PATENT DOCUMENTS

| | | | |
|---|---|---|---|
| DE | 102013003167 | A1 | 8/2014 |
| DE | 102018132938 | A | 6/2020 |
| WO | 2020108038 | A1 | 6/2020 |
| WO | 2020198038 | A1 | 10/2020 |

OTHER PUBLICATIONS

English translation of International Search Report dated Apr. 20, 2022 in parent application No. PCT/EP2022/050482.

Communication mailed Sep. 25, 2025, in related European patent application No. 22 700 478.5, and machine translation thereof.

Communication mailed Sep. 30, 2021, in related German patent application No. 10 2021 101 984.2, and machine translation thereof.

* cited by examiner 100
102
106
16
10
12
Layer
i+2
i+1
i
i-1
i-2
i-3
Build-up Direction
104
14
Z
X 30
22
32
$H_{Layer}$
$B_{Layer}$
$D_{LV}$
22

FIG 3
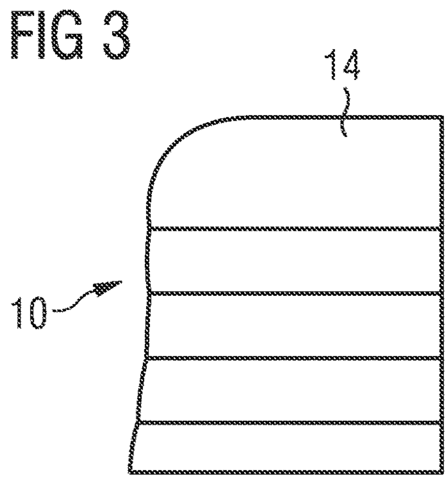
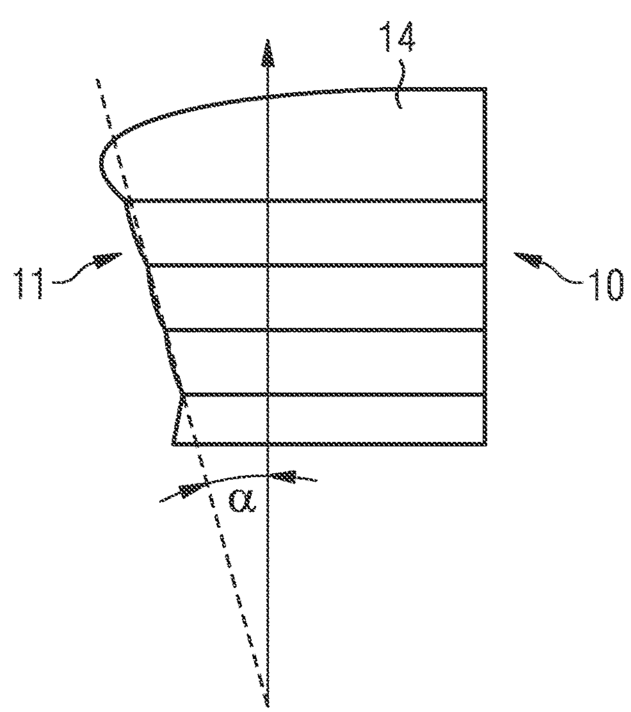
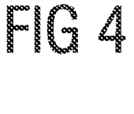
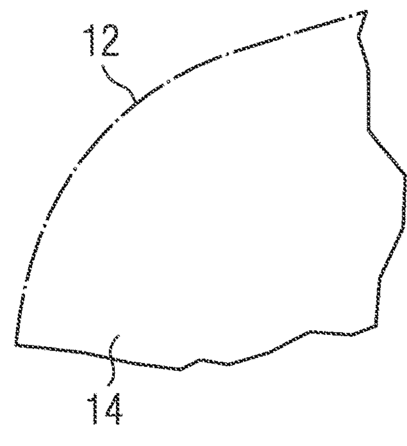
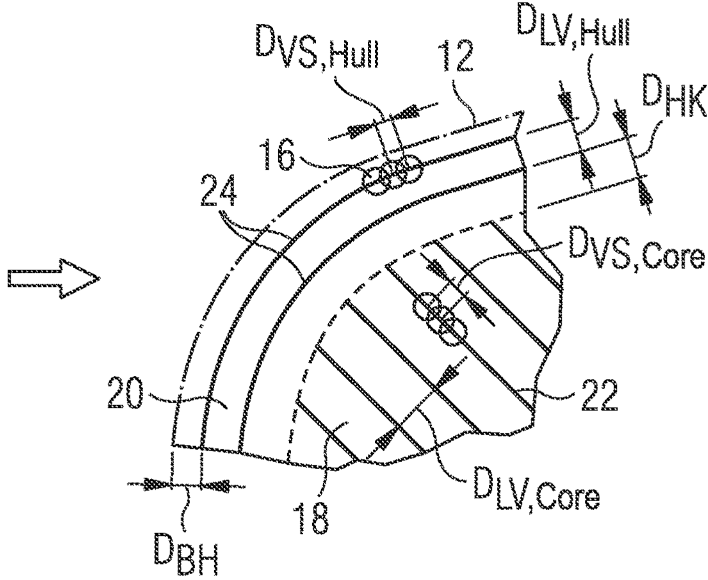

11
12
14
12
24'
24
Δ
$D_{BH}$
20
22
18

27
42
41
24
13
14
β
$f*D_{VS,Hull}$

METHOD AND APPARATUS FOR MANUFACTURING A COMPONENT IN LAYERS

CROSS-REFERENCE

This application is the US national stage of International Patent Application No. PCT/EP2022/050482 filed on Jan. 12, 2022, which claims priority to German Patent Application No. 10 2021 101 984.2 filed on Jan. 28, 2021.

TECHNICAL FIELD

The present disclosure relates to a method and an apparatus for manufacturing a component in layers, in particular by dropwise application of a liquid material using a printhead.

BACKGROUND ART

Additive manufacturing processes are characterized by a high degree of design freedom and by tool-free manufacturing. They are therefore particularly suited for individual parts and components having a high degree of complexity that cannot be manufactured using conventional manufacturing processes, or can be manufactured only at great expense. In these additive manufacturing processes, the workpieces are built up in layers or in elements based on digital models.

There are a variety of additive manufacturing processes, using which a component can be manufactured in layers. Typical processes for building up metallic components are the process known as "Laser Powder Bed Fusion" (LPBF), the "Direct Energy Deposition" (DED) process and the so-called "Material Jetting" (MJT) process, in which molten material is printed directly onto a build platform by a printhead through one or more individually controlled nozzles.

An apparatus that dispenses individual drops based on a control signal is usually referred to as a "drop-on-demand" (DOD) printhead. An electrical signal is sent to the printhead actuator for each drop to be generated. Depending on the number of nozzles in a printhead, two different strategies, which are referred to as raster-based printing or vector-based printing, can be used. In raster-based printing using a printhead having more than one nozzle, the printhead is, in general, moved in a meandering pattern over the component. In vector-based printing having only one nozzle, the movement of the printhead is freely selectable. In both cases, the spacing of the droplets along the feed direction results from the speed of the printhead and the frequency of the trigger signal sent to the printhead actuator. Furthermore, in raster-based printing, the line spacing transverse to the feed direction of the printhead results from the arrangement of the nozzles in the printhead and the direction of movement. In the case of vector-based printing, this spacing results solely from the selected path.

In vector-based printing, the signal for the droplet generation can be generated in two ways. For example, a constant printing frequency can be used and then, in general, the path speed during droplet dispensing is also chosen to be constant, because otherwise a uniform trace cannot be generated. Furthermore, it is possible to measure or simulate the traversed path during the generation of the same and to generate a new trigger signal each time the desired droplet spacing within the path is reached. In this way, variable path speeds can be used; however, a correspondingly accurate and high-frequency measurement technique is required.

WO 2020/198038 A1 describes a method for monitoring a layer height in an additive manufacturing process. For example, optical or other means are used to measure layers in a layer-by-layer manner. To correct any errors that may occur, parameters such as a drop size, a drop spacing and other conditions can be modified.

SUMMARY

It is one non-limiting object of the present disclosure to disclose techniques that make possible manufacturing of a component in layers, such that each layer may have a surface as flat as possible, a constant layer thickness and/or a pore volume as small as possible.

If one considers the geometry of a deposited droplet trace in additive manufacturing using the MJT process, its shape is highly dependent on various process parameters such as the droplet size, the speed of the droplets upon impact, the alloy composition, the temperature of the droplets and the substrate, one or more properties (material, structure, etc.) of the substrate, and the droplet spacing along the feed direction. As a result, neither the height nor the width of a trace is, in general, constant along the printing direction. As shown in FIG. 2, for example, there is in particular a rounding off of each trace at the end and at the beginning thereof, which can even be different. Furthermore, in the case in which multiple, possibly overlapping, traces are deposited along parallel paths, a layer produced in this way has a geometry which, in addition to the above-mentioned influences, also depends in particular on the spacing ($D_{LV}$) between the paths.

When building up multiple layers, the component edge is of particular interest. The surface tension of the liquid material used, for example a metal, enables the manufacture of overhangs; nevertheless, such an overhang has a negative effect on the flatness of the layer, because the component rounds off or sags toward the overhang. This is illustrated in an exemplary manner in FIG. 3. Even if no overhang is present, a similar problem can occur, as shown on the left in FIG. 3.

In one aspect of the present teachings, a hull-core strategy is utilized when building up three-dimensional components using the MJT process, in particular to reduce the rounding of edges and to produce layers that are as flat as possible. Thus, when printing the hull, compensation for overhanging component regions can be carried out. Furthermore, when printing the hull, idle-run loops can be used, in particular, to ensure a constantly high path speed during drop dispensing for paths having a large curvature or sharp corners.

In contrast to processes in which a measurement of the layer is required in order to make corrections if necessary, in the present invention the specific implementation is already known during path planning, and the strategies according to the invention require no additional equipment for the measurement and/or post-processing of the layers. Such additional equipment has significant disadvantages, especially in terms of manufacturing time, since it represents an additional process step. Moreover, it increases the degree of complexity of the machine, which has a detrimental effect on cost effectiveness. Another advantage of the present invention is that the compensation of overhanging regions of the component makes possible that more complex components having such overhanging regions can be manufactured without the use of support structures.

BRIEF DESCRIPTION OF THE DRAWINGS

Embodiments and further developments of the invention will be described below with reference to the Figures.

FIG. 3 shows two schematic side views of an edge area of a component without and with an overhang;

FIG. 4 shows a schematic top view for illustrating an application of a material layer in accordance with the method disclosed herein;

DETAILED DESCRIPTION

Figure 1:
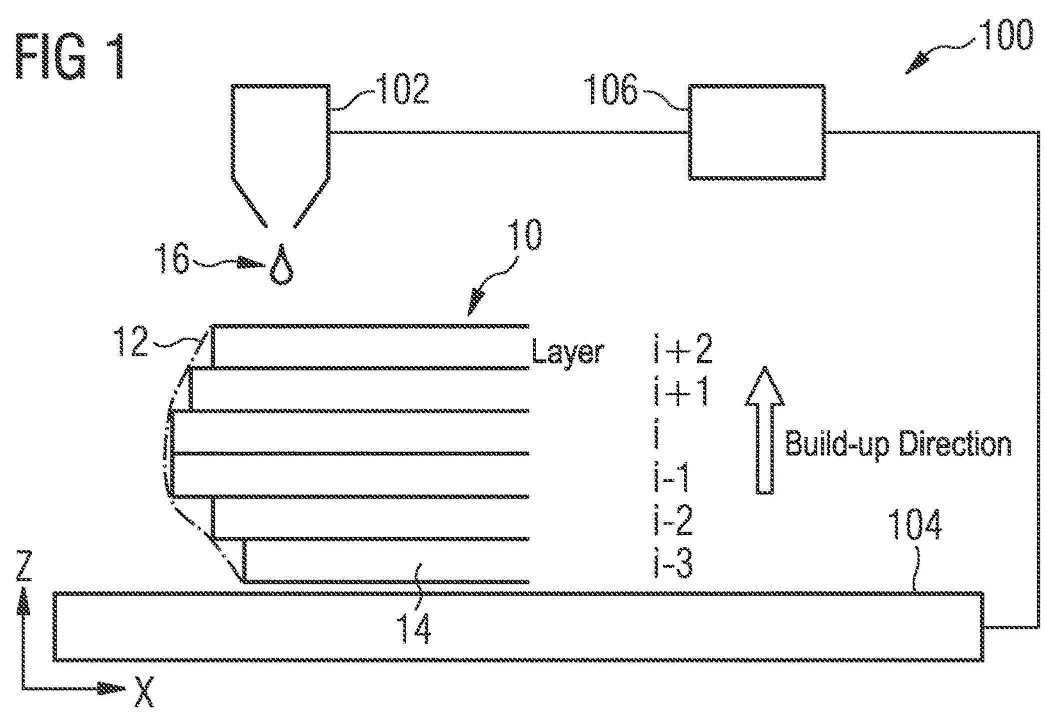
FIG. 1 shows a schematic side view that shows a manufacture of a component in layers using a printhead.

In the MJT process, three-dimensional components are built up in layers in a known manner. For example, FIG. 1 shows a portion of a component 10 consisting of multiple layers 14. The component 10 is manufactured by an apparatus 100 for additive manufacturing of the component 10. For this purpose, as shown in FIG. 1, the apparatus 100 includes a printhead 102 that is configured to apply a liquid material 16, a moving apparatus 104 that is configured to move the printhead 102 and the component 10 to be manufactured relative to each other, and a control device 106 that is configured to control the printhead 102 and the moving apparatus 104. In the example shown in FIG. 1, the build-up direction is the z-direction, and the printhead 102 and the moving apparatus 104 are moved relative to each other in the x-y plane in one layer and in the z-direction during the transition from one layer to the next. It is understood that the control device 106 can be configured to either move the printhead 102 with respect to the moving apparatus 104 and the component 10 disposed thereon, or conversely to move the moving apparatus 104 having the component 10 disposed thereon with respect to the printhead 102. A corresponding manufacturing technique is known to those skilled in the art, so that further details are not described herein.

The data for controlling the apparatus 100 are generated in advance from a digital model of the component to be manufactured. This is done with the aid of suitable algorithms. Thus, in a first step, the component is divided into layers (e.g., i−3, i−2, . . . , i+2) perpendicular to the build-up direction. An outer perimeter of the component 10 is defined by a contour 12.

In a second step, the machine control data required to manufacture each individual layer are calculated. According to the invention, a hull-core strategy is used to build up an individual layer by the deposition of individual drops along calculated paths.

FIG. 4 shows an example of the path planning of a layer according to the invention when using the hull-core strategy. As used herein, the term "hull" means an outer region 20 of the layer 14 that extends along and/or defines the contour 12 of the component 10. Furthermore, the term "core" means a central core region 18 of the layer that is at least partially surrounded by the outer region 20. In some embodiments, the hull completely surrounds the core, that is, it extends along the entire contour 12. However, it is understood that in other embodiments, the hull can be provided only along segments of the contour 12, for example, at the beginning and at the end of the respective core paths, and in particular need not be contiguous. It follows that in some embodiments, the core can define the contour 12 at least in sections, for example in regions in which there are lower requirements for the flatness of the layer. Further, the hull need not have a constant width, which will be discussed in more detail below.

In general, in the process according to the invention, the contour 12 of the component 10 to be manufactured is first defined in a layer 14 thereof, based on the aforementioned data of the digital model of the component to be manufactured. Based thereon, the outer region 20 of the layer 14 that extends along the contour 12 (the hull) and the central core region 18 of the layer 14, which is surrounded by the outer region 20 (the core), are then determined. Then, the paths required to form the hull and the core are calculated. Thereafter, the dropwise application of the liquid material 16 in the core region 18 and in the outer region 20 takes place along the calculated paths. In one example, the dropwise application of the liquid material 16 in the core region 18 takes place along multiple parallel, for example rectilinear, core paths 22 that have a first spacing $D_{LV,core}$ from each other. Preferably, the paths are selected in accordance with the geometry of the component so that they have the greatest possible length. Furthermore, the dropwise application of the liquid material 16 in the outer region 20 takes place along one or more outer paths 24 that extend parallel to the contour 12. Thus, it is understood that the application of the material in the core region and in the outer region can take place in any order, that is, it may be started either with the core region 18 or with the outer region 20. Furthermore, the application along the respective paths need not necessarily be continuous. For example, sections of individual paths can be skipped in a first pass and can be filled in in one or more later passes. The core region need not be completely filled with material, i.e., recesses and the like can be provided in the core region. In this context, it is also apparent that the contour 12 is not limited to an outer contour, but can also be an inner contour of the component. Furthermore, it is understood that two or more contours can also be present in a layer, so that two or more associated "outer" regions 20 can then also be present. The term "outer region" should therefore be understood broadly to indicate, in general, a region adjacent to a contour.

As shown in FIG. 4, in the present example the hull (the outer region 20) consists of one to five, for example two, paths, which in the case of multiple paths each have a spacing $D_{LV,hull}$ from one another. In the feed direction (i.e. along the path), the droplets of the hull are deposited at a constant spacing $D_{VS,hull}$. The core has a spacing $D_{HK}$ from the innermost path of the hull and is filled by the parallel core paths 22. Within the paths of the core, the droplets are deposited with a constant spacing $D_{VS,core}$. Even though constant spacings in the feed direction are used in the present example, it is understood that varying spacings can be used in other embodiments, for example in accordance with different requirements in different regions of the hull and/or the core. The same applies in a corresponding manner to the spacings between the paths, for example, of the core.

As can be seen from FIG. 4, the respective paths of the hull and the core are calculated so that the diameter of the droplets is taken into account accordingly, firstly to obtain the desired contour 12, and secondly to obtain a constant layer height, in particular in the transition region between hull and core. This leads to the fact that, as shown in FIG. 4, the outermost path of the hull extends at the spacing $D_{BH}$ from the contour 12, and likewise the innermost path of the hull extends at the spacing $D_{HK}$ from the paths of the core. Furthermore, it can be seen that herein a line along which the printhead 102 is moved with respect to the component 10 or the layer 14 thereof is meant by the term "path". The droplets are deposited in a corresponding manner along the path, wherein the start point and the end point of a path correspond to the center point of the first and the last deposited droplet, respectively. Depending on the position of the printhead 102 along a respective path, the printhead 102 is controlled in a suitable manner to deposit the individual drops with the desired spacing. Thus, it is understood that this is done in accordance with the path speed of the printhead 102 along the respective paths.

The deposited droplets have a (an average) diameter d, which is determined, in essence, by the amount of material dispensed per droplet and the physical properties of the material. Thus, in some embodiments, different average droplet diameters are used for the core region 18 and for the outer region 20, respectively, by suitably varying, for example, the amount of material dispensed per droplet. In particular, in the outer region 20, the average droplet diameter $d_{hull}$ can be less than or equal to the average droplet diameter $d_{core}$ in the core region 18. Droplet diameters of individual paths in the core region and/or in the outer region can have different sizes relative to each other.

The advantage achieved by the hull-core process will be explained once again with reference to FIG. 2. For example, FIG. 2 can be viewed as illustrating a portion of an exemplary core region within a layer. As was mentioned above, it can be seen that, for example, at the beginning 30 and at the end 32 of each core path 22, a rounding occurs that varies depending on the direction in which the core path 22 is traversed. This is a result of the dropwise application of the liquid material as the printhead moves. This leads to the different height ($H_{Layer}$) of the layer shown in the right part, in particular also at the beginning 30 and at the end 32 of the respective core paths 22. By providing the hull along the contour 12 of the component 10 according to the invention, these differences can be compensated. As will be explained again below, the spacing between the hull and the core $D_{HK}$, the spacing $D_{BH}$ between the outermost path of the hull and the contour 12, etc., for example, play a role here.

In some embodiments, the innermost one of the outer paths 24 is calculated so that it has a second spacing $D_{HK}$ from the core region 18 that is smaller than the first spacing $D_{LV,core}$ between the core paths 22 for at least a portion of the innermost path 24. In this way, a suitable overlap between the outermost droplets of the core and the droplets of the innermost path 24 of the hull can be created or enlarged.

In addition, it can be advantageous to define a third spacing $D_{BH}$ between an outermost one of the outer paths 24 and the contour 12 such that it is smaller than the first spacing $D_{LV,core}$ between the core paths 22, for example about half as large, to ensure that the contour 12 is maintained in this way.

Therefore, it is understood that the droplets of liquid material 16 have the average diameter d, and the second spacing $D_{HK}$ and/or the third spacing $D_{BH}$ can be approximately 0.4 to 0.6 times the average diameter d (for the case that differing diameters for the hull and core are used, the average droplet diameter $d_{hull}$ in the hull). In this way, as already explained, a layer as flat as possible can be obtained, and the contour 12 can be well maintained. As mentioned above, in some embodiments, droplets having different average diameters can be used in the core and in the hull. Droplets having a diameter (of the deposited droplets) between, for example, 200 and 1000 μm can be used.

In addition, it can be provided that a fourth spacing $D_{VS,hull}$ between adjacent droplets along the path on one of the outer paths 24 is about 0.6 to 1.1 times the average diameter d (of the hull), and/or a fifth spacing $D_{VS,core}$ between adjacent droplets on one of the core paths 22 is about 0.5 to 1 times the average diameter d (of the core). In particular, it is provided that the fifth spacing $D_{VS,core}$ is different from the fourth spacing $D_{VS,hull}$; for example, it is 0.7 to 0.95 times the same. Similarly, a sixth spacing $D_{LV,hull}$ between adjacent ones of the outer paths 24 can be determined so that it is 0.8 to 1.2 times the average diameter d of the droplets (in particular, of the hull). In addition, the first spacing $D_{LV,core}$ can also be 0.8 to 1.2 times the average diameter d of the droplets (of the core). In this way, the densest and flattest layer can be obtained.

It has also been found to be advantageous, for example, if at least two adjacent outer paths 24 are traversed in opposite directions, and/or at least two adjacent core paths 22 are traversed in opposite directions. In this way, systematic deviations that can occur when one direction is traversed can be compensated for.

Figure 2:
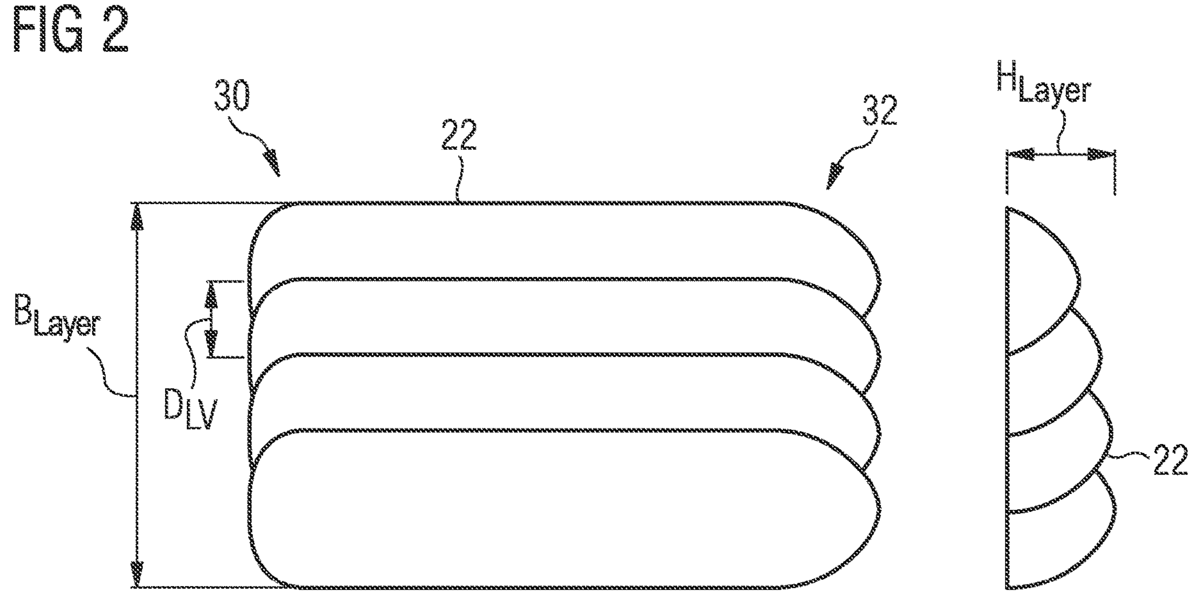
FIG. 2 shows a schematic top view and a schematic side view of multiple adjacent paths of a layer of material, which have an overall width denoted by $B_{Layer}$, applied by the printhead.

As explained with reference to FIG. 2, the rounding at the beginning 30 and at the end 32 of each path can be different. Therefore, it can be advantageous if the second spacing $D_{HK}$ between the core region 18 and the innermost of the outer paths 24 is varied so that it is different at the beginning 30 of each core path 22 than at the end 32. For example, if the core paths 22 in FIG. 4 are all traversed in the same direction, the spacing $D_{HK}$ in the section shown in FIG. 4 could be selected so that it is greater or less than the spacing on the opposite (not shown) side of the layer 14.

In some examples, it can also be advantageous if the core paths 22 and/or the outer paths 24 are traversed in two successive layers 14 in different directions. In this way, the height of the component 10 can be obtained as uniformly as possible. Additionally or alternatively, the paths of the hull in particular can start in successive layers at different, for example randomly selected, points.

By suitably choosing the above-explained spacings between the individual drops and paths, layers that are as flat as possible can be obtained according to the geometry of the component, without the need for corrections to compensate for an uneven layer height following completion of a layer.

As was already mentioned in the introduction, it is also possible to produce overhanging contours (also referred to as "downskin") using the LMP process. This is shown in an exemplary manner in FIG. 3. As can be seen in FIG. 3, such an overhang 11 of the component 10 is described, for example, by a first angle α to the build-up direction within a layer 14. It is understood that the first angle α can vary in the build-up direction, so that it can, in essence, be specified by the angle between the tangent to the contour 12 in a given layer 14 and the build-up direction.

Figure 5:
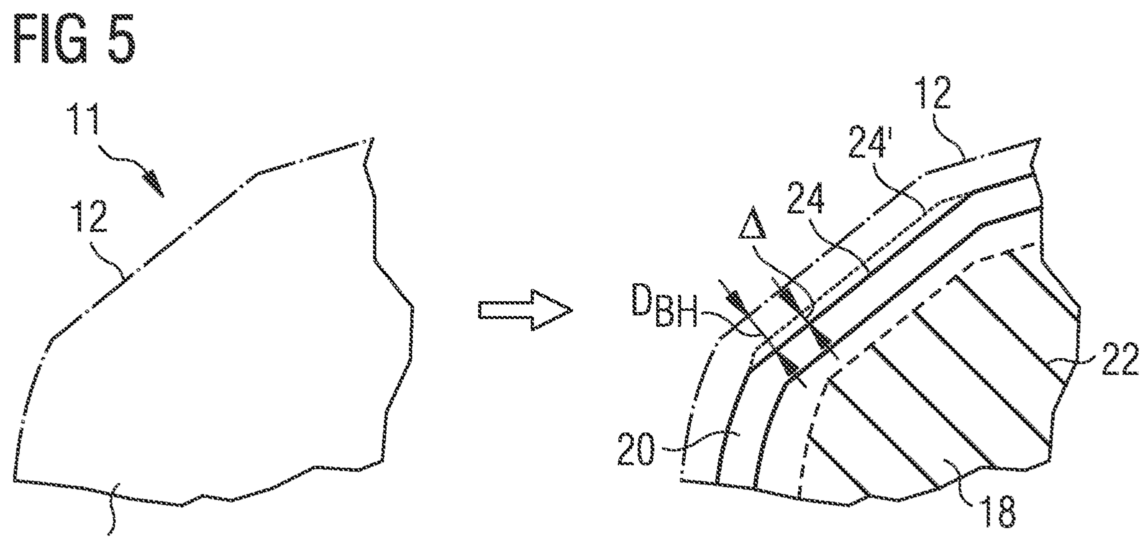
FIG. 5 shows another schematic top view for illustrating an application of a material layer in accordance with the method disclosed herein when an overhang is present.

As also shown in FIG. 3, the overhang can have a negative effect on the flatness of the layer, since the component can round off towards the overhang and sag. However, in accordance with the invention, it has been found that this can be counteracted by increasing the third spacing $D_{BH}$ between the outermost of the outer paths 24 of the hull and the contour 12 in the layer 14 in the region of the overhang 11 by a compensation spacing Δ, based on the first angle α. This is shown as an example in FIG. 5. In FIG. 5, dotted lines show the path 24' without correction that would be used if there were no overhang, while the path 24 actually used is corrected so that it extends further inward, that is, toward the core region 18, by the compensation spacing Δ. It can be seen that, in the example shown in FIG. 5, the contour 12 has the overhang 11 only in the area indicated by the solid line, while no correction of the spacing of the outermost of the outer paths 24 is made in the remaining area of the contour 12.

It has proved to be advantageous to select the compensation spacing Δ so that it is zero for an angle of 0° to the build-up direction and is increased as a function of the first angle α. Thus, for example, the spacing can be increased by 2 to 20 μm per degree. In other words, the greater the overhang, the further inward the outermost of the outer paths 24 is moved. It will be understood that, in some embodiments, multiple, or even all, of the outermost paths 24 of the hull may be moved inwardly. Thus, it can also be necessary or useful to reduce the second spacing $D_{HK}$ between the innermost of the outermost paths 24 and the core region 18, for example, by the compensation spacing Δ.

A further advantageous embodiment of the method described herein is described below with reference to FIG. 6.

Figure 6:
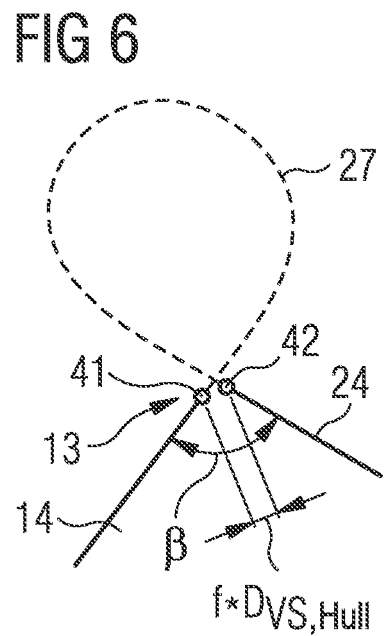
FIG. 6 shows a schematic view for explaining one way of applying material to a corner of a component.

As shown in FIG. 6, the contour 12 in the layer 14 can have a region 13 in which the contour has a local curvature that is greater than a predetermined value. In particular, the local curvature is thereby denoted by the curvature of the path between two successive drops 41, 42 in the region that, for example, the printhead 102 must traverse in order to deposit the successive drops 41, 42. In particular, the region 13 may correspond to a corner of the component 10 to be manufactured. At such a corner, for example, an angle R can be present between adjacent legs of a polygon shape. In such a case, the angle R can also be used as a measure for the curvature.

Since paths cannot be traversed at sufficiently high path speeds in regions of high local curvature due to the limited axis dynamics of the printhead 102 or the moving apparatus 104, lesser path speeds must be used in some circumstances, resulting in lower drop generation frequencies. However, this results in reduced energy input and thus local cooling of the component, which leads to undesirable deviations in the generated geometry, in particular at corners and the like. It has therefore proved to be advantageous to stop the drop generation at high path speed in such regions, to traverse a loop without applying drops, and to reach the corner point again at high path speed in the desired direction. Then droplet generation can start again. In this way, all drops can be applied at a substantially constant high speed.

In the example shown in FIG. 6, for example, the application of the individual drops takes place from left to right. This means that, upon reaching the region 13, a final droplet 41 is applied at high path speed, and then an auxiliary path 27 is traversed, wherein the application of the liquid material is stopped. In particular, the auxiliary path 27 is a closed auxiliary path outside the contour 12, which is traversed without applying liquid material 16. The auxiliary path 27 is calculated in a suitable manner so that the portion of the contour 12 at which the next drop 42 is to be applied can be reached at the desired speed in as short a time as possible. This is done using suitable optimization algorithms (for example, by nonlinear optimization using a known interior-point method), wherein, for example, a maximum relative speed between the printhead 102 and the moving apparatus 104, a maximum relative acceleration, or a maximum temporal change in the relative acceleration are used as constraints in an optimization with respect to the time required to traverse the auxiliary path 27. In particular, jerking of the printhead or the moving apparatus due to large accelerations and/or changes in acceleration is to be avoided. Over the course of this, a position of the last droplet 41 on the outer path 24 before stopping of the application and, based thereon, a position of the first droplet 42 on the outer path after continuation of the application can further be determined so that a direct spacing $f^*D_{VS,hull}$ between the two droplets is a predetermined spacing. For example, this spacing can be 0.8 to 1.2 times the spacing $D_{VS,hull}$ between adjacent drops in sections of the outer path 24 in which the contour 12 does not include the region 13.

Using the methods described above, the present invention makes it possible to obtain a layer thickness that is as uniform as possible within each layer 14, in particular even when an overhang is formed, without having to perform additional measurements or provide additional devices. This is achieved by calculating in advance all of the paths to be traversed in one layer, taking into account the partition into hull and core, depending, if necessary, on whether there are overhangs or corners of the component.

In a simplest case, in which the component 10 has no overhang and no regions of high local curvature, and the core area is completely filled with material, the outer region can be defined, for example, so that it completely surrounds the core region and has a desired width. Then, in a first step, the core region can be traversed along parallel paths until it is completely filled. Following this, the outer region is then traversed, for example along one to five outer paths, which have predetermined spacings from one another or from the contour and from the core region. Following this, it can proceed with the production of the subsequent layer.

It is explicitly emphasized that all features disclosed in the description and/or claims are to be considered separate and independent from each other for the purpose of the original disclosure as well as for the purpose of limiting the claimed invention regardless of the combinations of features in the embodiments and/or claims. It is explicitly stated that all range indications or indications of groups of units disclose all possible intermediate values or subgroups of units for the purpose of the original disclosure as well as for the purpose of limiting the claimed invention, in particular also as a limit of a range indication.

The invention claimed is:

1. A method of manufacturing a component in layers by dropwise application of a liquid material using a printhead, the component including an overhang that extends in a layer of the component at a first angle (α) to a build-up direction, the method comprising:

- defining a contour of the component to be manufactured in the layer;
- defining an outer region of the layer that extends along the contour and a central core region of the layer that is surrounded by the outer region;
- dropwise applying the liquid material with a first average droplet diameter ($d_{core}$) in the core region along multiple parallel core paths that have a first spacing ($D_{LV,core}$) from each other; and
- dropwise applying the liquid material with a second average droplet diameter ($d_{hull}$) in the outer region along one or more outer paths parallel to the contour, wherein a second spacing ($D_{BH}$) between an outermost one of the outer path(s) and the contour in the layer is increased proximal to the overhang by a compensation spacing (Δ) that is based on the first angle (α).

2. The method according to claim 1, wherein;

in the step of dropwise applying the liquid material with a second average droplet diameter ($d_{hull}$) in the outer region, the liquid material is dropwise applied in the outer region along at least two outer paths, and an innermost one of the outer paths is spaced apart from the core region by a third spacing ($D_{HK}$) that is less than the first spacing ($D_{LV,core}$) at least for a portion of the innermost one of the outer paths.

3. The method according to claim 2, wherein:

each of the core paths has a beginning, at which the application of the liquid material is begun, and an end, at which the application of the liquid material is ended, and the third spacing (DHK) between the core region and the innermost one of the outer paths is varied such that the third spacing ($D_{HK}$) at the beginning of said core path is greater or less than the third spacing (DHK) at the end of said core path.

4. The method according to claim 2, wherein the compensation spacing ($\Delta$) is increased as a function of the first angle ($\alpha$), and further comprising reducing the third spacing ($D_{HK}$) by the compensation spacing ($\Delta$).

5. The method according to claim 1, wherein:

in the step of dropwise applying the liquid material with a second average droplet diameter ($d_{hull}$) in the outer region, at least two outer paths are dropwise applied in the layer, and the second spacing ($D_{BH}$) between the outermost one of the outer paths and the contour is less than the first spacing ($D_{LV,core}$).

6. The method according to claim 5, wherein:

an innermost one of the outer paths is spaced apart from the core region by a third spacing ($D_{HK}$) that is less than the first spacing ($D_{LV,core}$) at least for a portion of the innermost one of the outer paths, and the second spacing ($D_{BH}$) and/or the third spacing ($D_{HK}$) is about 0.4 to 0.6 times the second average droplet diameter ($d_{hull}$).

7. The method according to claim 6, wherein a sixth spacing ($D_{LV,hull}$) between at least two adjacent ones of the outer paths is 0.8 to 1.2 times the second average droplet diameter ($d_{hull}$) and/or the first spacing ($D_{LV,core}$) is 0.8 to 1.2 times the first average droplet diameter ($d_{core}$).

8. The method according to claim 6, wherein a fourth spacing ($D_{VS,hull}$) between adjacent droplets on one of the outer paths is about 0.6 to 1.1 times the second average droplet diameter ($d_{hull}$), and/or wherein a fifth spacing ($D_{VS,core}$) between adjacent droplets on one of the core paths is about 0.5 to 1 times the first average droplet diameter ($d_{core}$).

9. The method according to claim 8, wherein the fifth spacing ($D_{VS,core}$) is different from the fourth spacing ($D_{VS,hull}$).

10. The method according to claim 9, wherein the fifth spacing ($D_{VS,core}$) is 0.7 to 0.95 times the fourth spacing ($D_{VS,hull}$).

11. The method according to claim 1, wherein the second average droplet diameter ($d_{hull}$) is smaller than or equal to the first average droplet diameter ($d_{core}$).

12. The method according to claim 1, wherein:

in the step of dropwise applying the liquid material with a second average droplet diameter ($d_{hull}$) in the outer region, at least two outer paths are dropwise applied in the layer, and at least two adjacent ones of the outer paths are traversed in opposite directions, and/or wherein at least two adjacent ones of the core paths are traversed in opposite directions.

13. The method according to claim 1, wherein:

in the step of dropwise applying the liquid material with a second average droplet diameter ($d_{hull}$) in the outer region, at least two outer paths are dropwise applied in the layer, and the core paths and/or the outer paths are traversed in two successive layers in different directions.

14. The method according to claim 1, wherein the compensation spacing ($\Delta$) is increased as a function of the first angle ($\alpha$).

15. The method according to claim 14, wherein the compensation spacing ($\Delta$) increases by 2-20 μm per degree of the first angle ($\alpha$).

16. The method according to claim 1, wherein the contour in the layer includes a curved region in which the contour has a local curvature that is greater than a predetermined value, the method further comprising:

stopping the application of the liquid material when traversing one of the outer paths upon reaching the curved region;

traversing a closed auxiliary path that adjoins one of the outer paths outside the contour without applying the liquid material; and continuing the application of the liquid material after traversing the closed auxiliary path when the printhead reaches the curved region again.

17. The method according to claim 16, further comprising:

determining the closed auxiliary path as a function of at least one of a maximum relative velocity, a maximum relative acceleration, or a maximum temporal change in relative acceleration of the printhead with respect to the component; and/or determining a position of a last drop on the outer path before the stopping of the application and, based thereon, determining a position of a first drop on the outer path after continuation of the application so that a direct spacing ($f^*D_{VS,hull}$) between the last and first drops is a predetermined spacing.

18. The method according to claim 17, wherein the predetermined spacing is 0.8 to 1.2 times the spacing ($D_{VS,hull}$) between adjacent drops in sections of the outer path in which the contour does not have the curved region.

19. The method according to claim 1, wherein the compensation spacing ($\Delta$) is proportional to the first angle ($\alpha$).

20. An apparatus for additive manufacturing of a component, comprising:

a printhead configured to apply a liquid material;

a moving apparatus configured to move the printhead and/or the component to be manufactured relative to each other; and a control device configured to control the printhead and the moving apparatus to perform the method according to claim 1.

* * * * *